UNITED STATES PATENT OFFICE.

ALBERT L. CLAPP, OF BRAINTREE, MASSACHUSETTS, ASSIGNOR TO HIDE-ITE LEATHER COMPANY, OF BOSTON, MASSACHUSETTS, A CORPORATION OF MAINE.

PROCESS FOR THE PRODUCTION OF LEATHER-FIBER BOARD.

1,119,345. Specification of Letters Patent. Patented Dec. 1, 1914.

No Drawing. Application filed December 26, 1911. Serial No. 667,737.

*To all whom it may concern:*

Be it known that I, ALBERT L. CLAPP, a citizen of the United States, residing at Braintree, in the county of Norfolk and State of Massachusetts, have invented certain new and useful Improvements in Processes for the Production of Leather-Fiber Board, of which the following is a specification.

My present invention pertains to an improved process for the production of leather-fiber board, the main object of the invention being to produce a leather-board which will be substantially waterproof.

A further object of the invention is to so treat the raw material (scrap tanned leather of all kinds) as to soften and cause it to swell previous to its disintegration by the regular beater engine process. This is of material advantage from several points of view; firstly, one is enabled to reduce the time required for beating-out nearly one-half; say, to three to four hours instead of from six to eight hours; secondly, the scrap thus treated will yield a larger percentage of fiber than when beaten-up in the ordinary manner, and consequently a larger quantity of finished board may be produced. This is illustrated by the fact that when scrap leather is beaten out in the ordinary way there is a certain proportion of the scrap that the knives of the beater engine will not brush out to a fibrous condition or consistency. This is due to the fact that the grain side of the leather has been finished to a hard surface by rolling and polishing, and such surface does not readily soften during the beating-out process, and instead of being brushed or brought to a fibrous consistency is cut into small chunks or nubs. Such portions are now screened from the fibrous stock and do not enter into the finished fiberboard. As the percentage of these nubs is sometimes as high as 15% to 20% of the scrap treated, the advantage of softening and swelling the scrap prior to its being beaten-out will be readily appreciated, the entire, or substantially entire, charge being utilized, or in other words, converted into usable fiber.

As the soaking of the leather scrap in water does not sufficiently soften the hard surface thereof to enable it to be all beaten out, I have devised a chemical treatment which is very effective, and which when fully carried out produces a waterproof leather-fiber board. The treatment may be said to comprise two main steps; first, the treatment of the scrap, and secondly, the treatment of the fibrous mass produced by the first step, to render it waterproof. In carrying out the first step, I load, say, 1200 pounds of tanned leather scrap into a rotary tank, preferably situated over the beater engine, together with sufficient water to cover the scrap. To this there is added about 60 to 70 pounds of potassium bichromate and about 15 pounds of hydrochloric acid, the amount of acid being determined by the amount of tannin in the scrap, and as to which more will be said hereinafter. The contents of the tank are now gently warmed to about 110° F. and kept in constant agitation from fifteen to twenty minutes. The temperature should not exceed 110° F. as this is a safe point at which to work without fear of coagulating the gelatinous matter carried by the fibers, or destroying the leather fibers themselves.

The chemical action which takes place is quite energetic and causes the tanned scrap to swell and become quite soft in a relatively short time. The swelling is due, it is believed, to the absorption by the pores of the leather of the chromic acid which is produced by the interaction of the potassium bichromate and the hydrochloric acid or the tannic acid present in the leather. The reaction may be stated as follows:

$$K_2Cr_2O_7 + 2HCl = Cr_2O_6 + 2KCl + H_2O.$$

As soon as the action is complete and the leather sufficiently soft, which is usually accomplished in the time above stated, the contents of the tank are then dumped into the beater engine, and water of an amount to render the mixture of the desired pulpy consistency when beaten out, is added.

In some cases, if desired, the beater engine may have been partially loaded with paper stock, bagging or other cellulose materials, on top of which the treated scrap leather is dumped. In case this is done, it is desirable to beat out such stock an hour or so before mixing the leather scrap therewith, in order to equalize the time of bringing the two bodies into the desired pulpy consistency. Such stock is mainly used to float the leather stock in the beater and to give to the finished board a more fibrous body. The amount of cellulose stock employed is generally from 15% to 20% of the tanned scrap. The second step in the process consists in treating the stock thus produced with certain chemicals which will reduce the chromic acid formed in the stock as above set forth, to chromic oxid, which combining with the gelatin in the leather, produces an insoluble chrome compound. This step is carried on while the stock is being disintegrated in the beater engine.

To bring about the production of the insoluble chrome compound, I prepare a solution of hypo-sulfite of soda, acidified with hydrochloric acid, using about 120 pounds of the hypo-sulfite. The solution may be prepared in any suitable vessel and is added to the beater while the stock is in motion, the hypo-sulfite and acid reacting to produce sulfur dioxid which acts as a reducing agent upon the chromic acid present in the stock. There are many other chemicals which may be used as reducing agents, such as tartaric acid, oxalic acid, various ferrous salts, cuprous salt, hydrogen gas, or hydrogen sulfid, or any combination of chemicals which will produce the same. In case hydrogen or hydrogen sulfid be used, the gas can be passed directly into the beater through pipes connected to suitable generators.

In carrying out the first step of the process as above outlined, I have discovered that in some cases the scrap leather employed contained sufficient free tannic acid to convert the bichromate salt into chromic acid, thereby dispensing in whole or in part with the use of any hydrochloric acid. The amount of hydrochloric acid necessary to employ depends, of course, upon the acidity of the leather, it being desirable to use as small a quantity of hydrochloric acid as possible. The presence of hydrochloric acid serves to start the action of the weaker tannic acid, which latter is largely depended upon to convert the chrome salt.

Where the leather-board, after being formed upon a wet machine or the like, from stock as above produced, is waxed by the use of paraffin, which is sometimes desirable, I find that the paraffin is oxidized by the chromic acid, while the latter is at the same time reduced to chromic oxid. The paraffin appears to become oxidized or transformed into an acid-like body which is insoluble in water and becomes thoroughly attached to or precipitated upon the fibers. When the board is to receive such paraffin treatment, I do not carry the second step of reduction to a complete conversion of the chrome acid into a chromic oxid, but add just enough hypo and acid mixture to partly start the reduction, the amount of hypo in such case being reduced to about 25 to 30 pounds. Such amount is sufficient to render the gelatin insoluble and at the same time carries in a quantity of chromic acid sufficient to act upon the paraffin in the manner just stated.

The board produced from the stock treated as above set forth has an insoluble chrome compound distributed throughout the same and consequently is waterproof to a greater or less extent.

Having thus described my invention, what I claim is:

1. The process of producing stock for leather-board from tanned leather scrap; which consists in treating the scrap with chemicals adapted to produce chromic acid which tends to soften the scrap; and thereafter beating-out the scrap thus treated in the presence of a reducing agent.

2. The process of producing stock for leather-board from tanned leather scrap, which consists in treating the scrap with potassium bichromate and hydrochloric acid whereby chromic acid is produced and the hard face of the scrap softened thereby; and thereafter beating-out the stock thus treated in the presence of a reducing agent.

3. The process of producing leather-board stock from scraps of tanned leather, which consists in treating the scrap with potassium bichromate and hydrochloric acid and thereby forming chromic acid in the stock; and thereafter beating-out the scrap thus treated with a mixture of hyposulfite of soda and hydrochloric acid, whereby the chromic acid produced in the initial treatment is reduced to chromic oxid.

4. The process of producing leather-board stock from scraps of tanned leather, which consists in forming chromic acid in the stock; and thereafter beating-out the stock in the presence of a reducing agent.

5. The process of producing leather-board stock from scraps of tanned leather, which consists in forming chromic acid in the stock, and at the same time agitating and heating the same; and thereafter beating-out the stock thus treated in the presence of a reducing agent.

6. The process of producing leather-board stock from scraps of tanned leather, which consists in treating the stock with potassium bichromate and hydrochloric acid and thereby producing chromic acid in the stock, and at the same time agitating and heating the mass; and thereafter adding to the mass a mixture of hyposulfite of soda and hydrochloric acid and beating-out the fibers.

7. The process of producing leather-board stock from scraps of tanned leather, which consists in forming chromic acid in the stock; thereafter beating-out the stock and treating the stock with a reducing agent of a quantity sufficient to partially reduce the chromic acid; and finally reducing the remaining chromic acid by the addition of an inherently waterproof material which acts to reduce to the unconverted acid.

In testimony whereof I have signed my name to this specification in the presence of two subscribing witnesses.

ALBERT L. CLAPP.

Witnesses:
GEORGE E. SAMPSON,
FLORENCE J. TIRRELL.